United States Patent [19]

Connolly

[11] 4,343,981

[45] Aug. 10, 1982

[54] RESISTANCE WELDING MACHINE

[76] Inventor: James D. Connolly, P.O. Box 1238, Princeton, W. Va. 24740

[21] Appl. No.: 184,982

[22] Filed: Sep. 8, 1980

[51] Int. Cl.³ .................... B23K 11/32; B23K 37/04; B21F 15/08; B21F 27/10

[52] U.S. Cl. ........................................ 219/56; 219/87; 219/116; 219/159

[58] Field of Search ............. 219/56, 58, 86.1, 86.24, 219/86.25, 158, 161, 87, 116; 140/112

[56] References Cited

U.S. PATENT DOCUMENTS

| | | | |
|---|---|---|---|
| 2,155,095 | 4/1939 | Krämer | 219/56 |
| 3,286,072 | 11/1966 | Ritter et al. | 219/56 |
| 3,588,417 | 6/1971 | Gott et al. | 219/56 |
| 3,780,253 | 12/1973 | Senn | 219/56 X |
| 3,798,405 | 3/1974 | Boothe | 219/56 |
| 3,939,879 | 2/1976 | Tolliver et al. | 219/56 X |
| 3,961,153 | 6/1976 | Smith et al. | 219/56 |
| 4,149,059 | 4/1979 | Gott et al. | 219/56 |
| 4,174,475 | 11/1979 | Senn | 219/56 |
| 4,221,951 | 9/1980 | Connolly | 219/56 |

Primary Examiner—J. V. Truhe
Assistant Examiner—Keith E. George
Attorney, Agent, or Firm—Wilmer Mechlin

[57] ABSTRACT

A resistance welding machine for progressively welding each of a succession of transverse wires to longitudinal wires at a transverse welding station to and through which the longitudinal wires are incrementally advanced, the machine having a welding unit including a carriage mounted above the welding station for intermittent and reversible movement transversely of the machine and longitudinally of the welding station, a transformer vertically reciprocable in the carriage by a power unit mounted thereabove on the carriage, and a ram suspended from the transformer for movement in unison therewith and mounting for limited relative vertical movement a welding head carrying a front welding electrode, and a vertically movable guide bar and stationary platen, both electrically conductive and mounted independently of the welding unit, the guide bar below the ram and in advance of the welding station for guiding the longitudinal wires thereto and the platen underlying and supporting the longitudinal wires below both the guide bar and the welding station, and insulated conductors on the ram each connected to a secondary lead of the transformer and one connected to a conductor on the welding head and the other connectable to the guide bar, the ram and welding head in an advance stroke under force of the power unit transmitted through the transformer, acting for sequentially clamping the longitudinal wires against movement by the guide bar and the presented part of the transverse wire to a plurality of longitudinal wires by the electrode for welding the transverse wire to the longitudinal wires by welding current flowing between the secondaries of the transformer through the guide bar, the platen and the electrode on the welding head.

17 Claims, 7 Drawing Figures

RESISTANCE WELDING MACHINE

BACKGROUND OF THE INVENTION

Heretofore, machines for fabricating by resistance welding screens, mats or like structures formed of crossed, laterally spaced longitudinal and transverse wires, rods or bars, have been provided for each crossing point at the welding station at which the welding operation is performed, either with a pair of upper and lower electrodes, the lower of which usually is stationary and the upper vertically movable, as in Gott U.S. Pat. No. 3,588,417, or, if a pair of spaced transverse wires are simultaneously welded to the longitudinal wires, with a pair of vertically movable upper electrodes for the corresponding crossing points of the transverse wires, with welding current flowing between the electrodes through a conductive anvil underlying both points, as in Smith et al U.S. Pat. No. 3,961,153.

An alternative, provided in Fotie U.S. Pat. No. 2,422,829, is a vertically movable upper electrode for each crossing point of a row extending across the longitudinal wires and a common lower electrode of like extent. If, as in Fotie, the current is supplied to the electrodes through transformers, the transformers usually are stationary and connected to the electrodes by flexible secondary leads, with consequent reduction, from the increased length of the leads, in the current available at the electrodes. This loss, Gott et al in U.S. Pat. No. 4,149,059, sought to minimize by mounting transformers for adjoining rows of vertically movable upper electrodes in a common pressure bar, with the secondary leads of the transformers for each row connected by sliding contacts to the electrodes of that row.

As opposed to conventional resistance welding machines in which the upper electrodes either are movable only vertically or, as in Gott et al U.S. Pat. No. 3,588,417, are also adapted for limited transverse movement to permit the spacing of the longitudinal wires to be varied, by providing for each pair of electrodes a pair of contact shoes slidable on conductor rails, Osborn in U.S. Pat. No. 1,042,466, discloses a so-called "traveling electric welding apparatus" in which a carriage riding on flanges of an overlying beam, has suspended therefrom a transformer, the flexible secondary leads of which in turn suspend a pair of electrodes. A threaded connection between the transformer and the carriage, through which the transformer and electrodes are movable vertically in unison, enables the electrodes to be adjusted vertically to suit the particular workpiece in the welding station, but only by manual actuation of the pivoted jaws mounting them can the electrodes exert pressure on the unnamed workpiece grasped between them. The earlier mentioned Smith et al patent also discloses the mounting of its pair of electrodes in a welding head in turn mounted in a carriage drivable intermittently along a welding station for enabling the pair of electrodes to sequentially weld a pair of transverse wires at all crossing points to the longitudinal wires but mentions neither a transformer nor any relation of one to either the carriage or the welding head.

The present invention is particularly concerned with an improved resistance welding machine, in which a welding unit is movable transversely of longitudinal wires along a welding station for welding a transverse wire to the longitudinal wires.

SUMMARY OF THE INVENTION

The primary object of the present invention is to provide an improved resistance welding machine for welding a succession of transverse wires to longitudinal wires at a welding station extending across the longitudinal wires, wherein each transverse wire is welded to successive groups of longitudinal wires by a welding unit intermittently drivable along the welding station.

Another object of the invention is to provide a resistance welding machine for progressively welding each of a succession of transverse wires to incrementally advanced longitudinal wires at a welding station extending across the longitudinal wires, by a welding unit including a carriage intermittently and incrementally drivable along the welding station and mounting for relative vertical movement a transformer, a ram suspended therefrom and mounting a welding head, and power means acting through the transformer and ram on the welding head for sequentially clamping parts of a transverse wire in the welding station against longitudinal wires presented thereto.

An additional object of the invention is to provide a resistance welding machine for welding one set of members in succession to another member or set of members at a welding station extending across the other member or set of members, by a welding unit including a carriage intermittently drivable in either direction along the welding station, a transformer mounted for relative vertical movement in the carriage, ram means suspended from the transformer for movement in unison therewith and suspending for limited relative vertical movement a welding head, and power means on the carriage for alternately advancing and retracting the transformer and therethrough the ram means and welding head respectively in and between each welding step of the progressive welding of a transverse wire to the longitudinal wires.

A further object of the invention is to provide a resistance welding machine for progressively welding each of a succession of transverse wires to a plurality of incrementally advanced longitudinal wires at a welding station extending across the longitudinal wires, in which the longitudinal wires are guided in spaced relation to the welding station by a guide bar extending thereacross and mounted for limited vertical movement, the means for welding the transverse wires to the longitudinal wires includes a welding unit having a carriage intermittently drivable along the welding station, a transformer vertically reciprocable in the carriage, a ram suspended from the transformer for vertical movement in unison therewith and suspending for limited relative vertical movement a welding head, and a double-acting hydraulic cylinder unit mounted on the carriage and acting through the transformer vertically advances and retracts the ram and therewith the welding head, the ram in an advance stroke in a step of a welding operation on a transverse wire in the welding station acting independently on the welding head and the guide bar through interposed spring means and against an underlying platen for clamping respectively a part of the transverse wire to any longitudinal wires presented therethrough and the longitudinal wires against movement.

An additional object of the invention is to provide a welding machine of the character described in the immediately preceding object, wherein the ram in acting in an advance stroke on the welding head and guide bar sequentially clamps the longitudinal wires against movement and the transverse wire in the welding station against longitudinal wires presented thereto and the spring means acting between the ram and welding head yieldably resist displacement of the transverse wire in response to forces developed by welding current passed therethrough.

Another object of the invention is to provide a welding machine of the character described in the immediately preceding object, in which secondary leads of the transformer are each connected to one of a pair of relatively insulated conductors on the ram, one connected to the welding head and the other connectable to the guide bar, and in a welding step pulsed direct current, supplied to the primary of the transformer from a capacitor bank, flows between the secondary leads through the guide bar, platen and an electrode on the welding head.

A further object of the invention is to provide a resistance welding machine of the character described in the immediately preceding object in which the set of longitudinal wires for a welding operation are fed to the welding station from any of a plurality of interchangeable, independently loadable feed tables, each carrying and in feeding position presenting in welding position the platen and guide bar used in the welding operation.

Other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
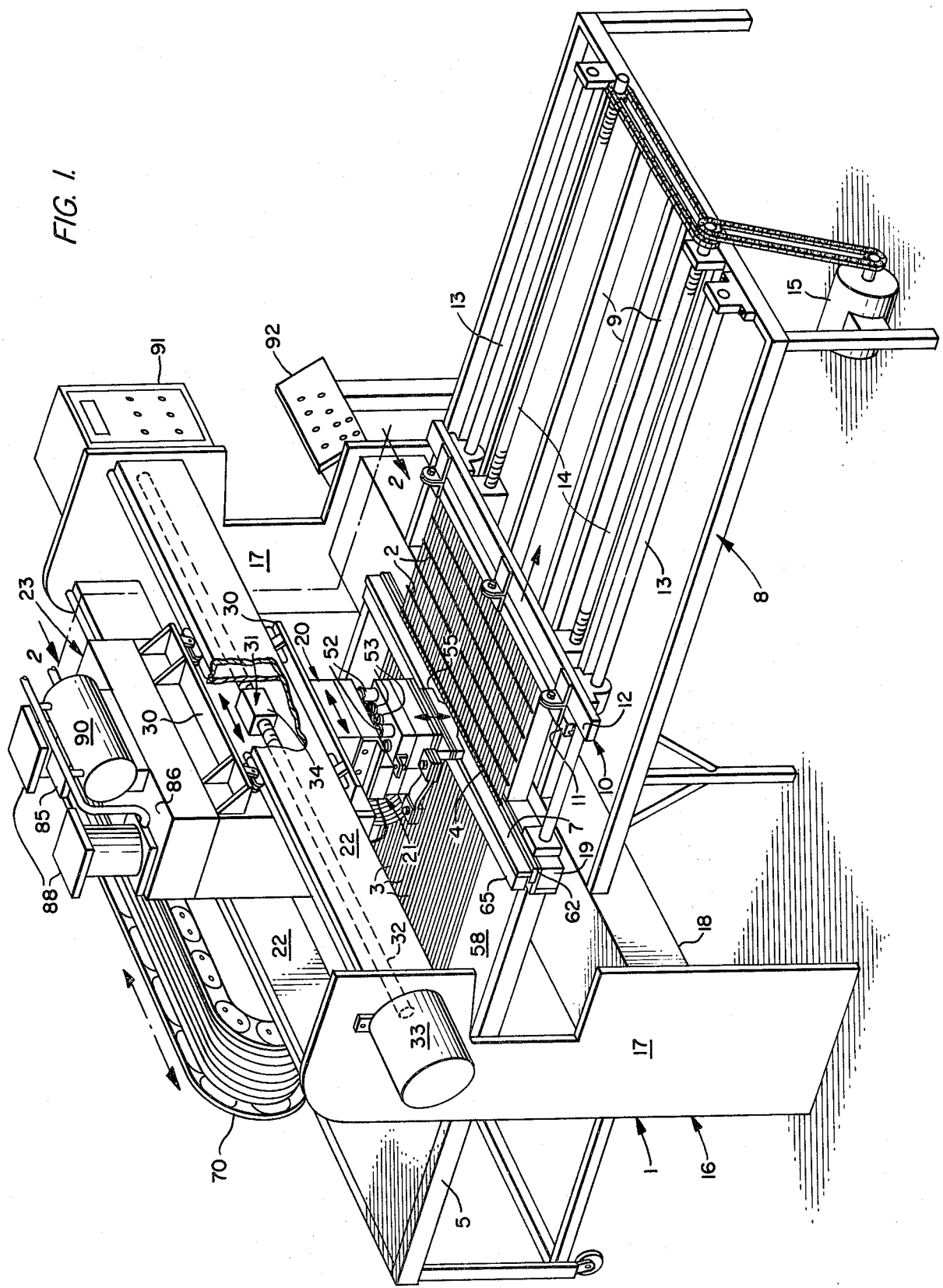
FIG. 1 is a perspective view of the improved resistance welding machine of the present invention.
Figure 2:
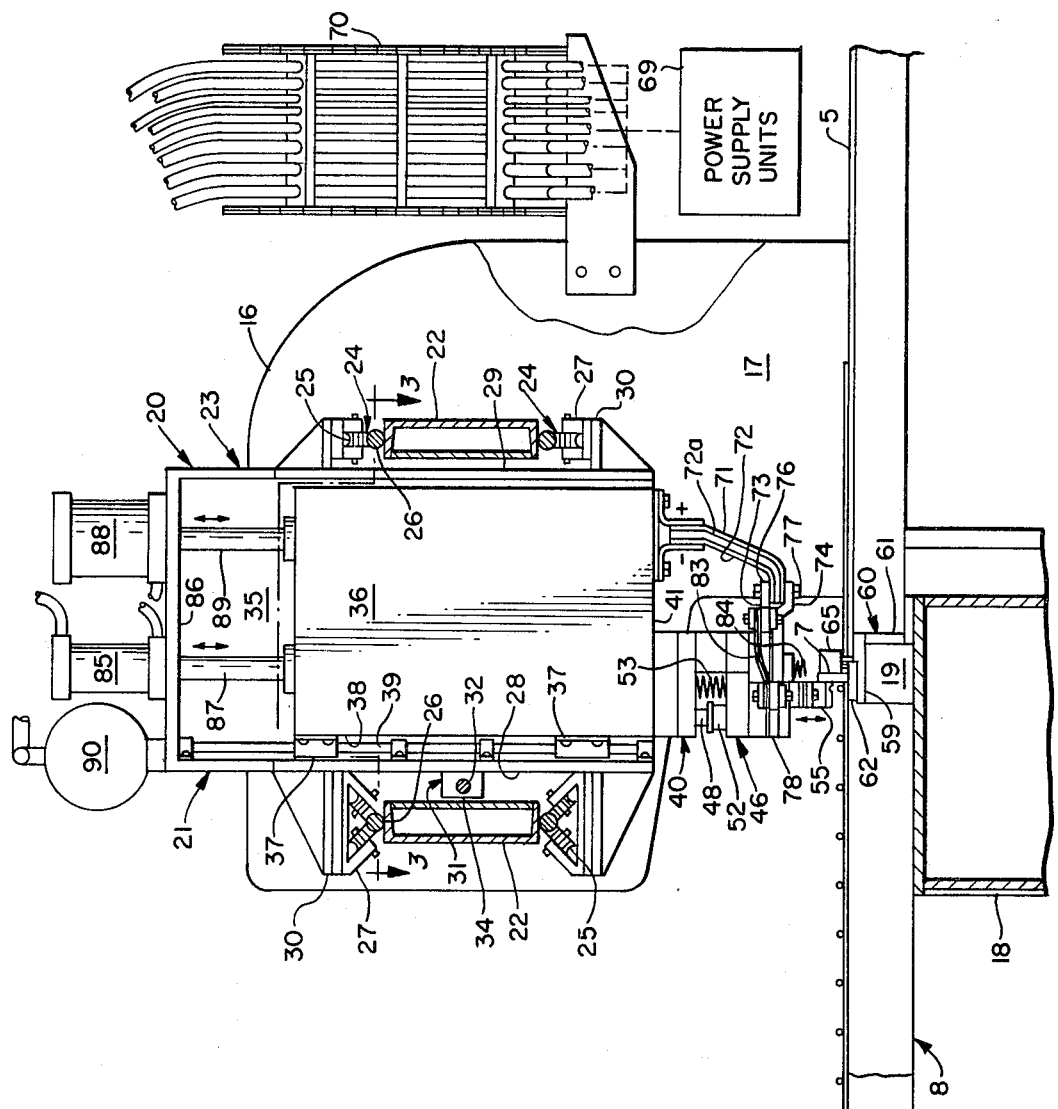
FIG. 2 is a fragmentary vertical sectional view taken along lines 2—2 of FIG. 1.
Figure 3:
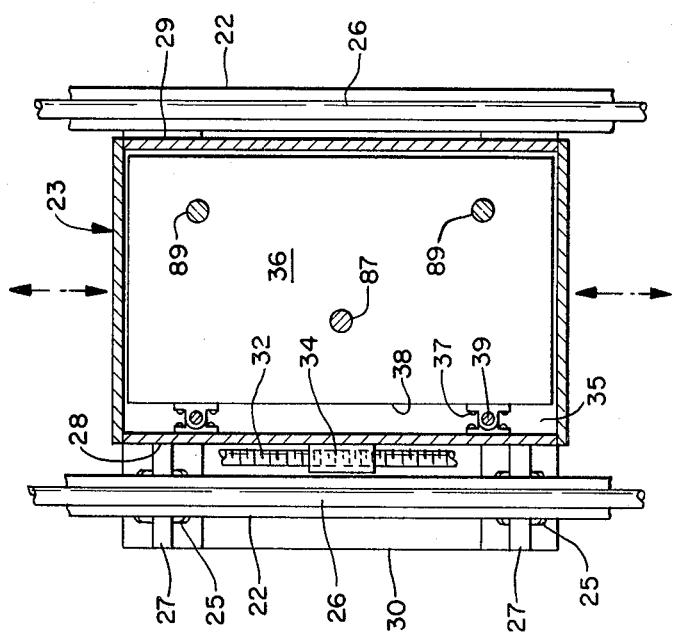
FIG. 3 is a fragmentary horizontal sectional view taken along lines 3—3 of FIG. 2.
Figure 5:
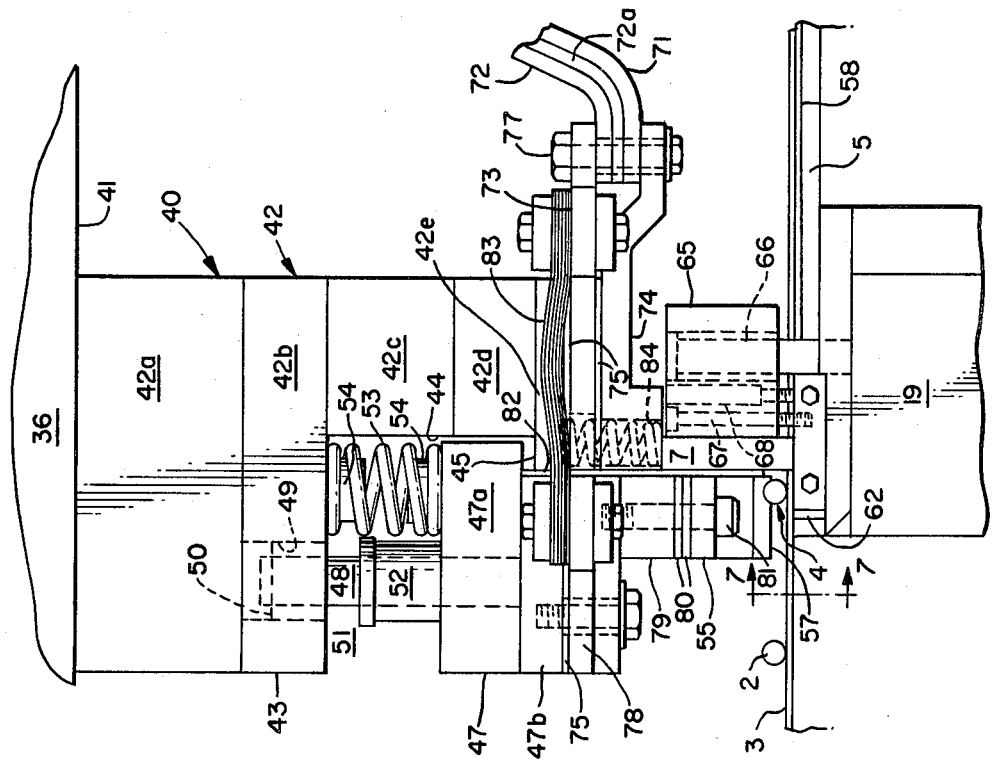
FIG. 5 is a view similar to and on the scale of FIG. 4 showing the ram and welding head advanced to welding position.
Figure 4:
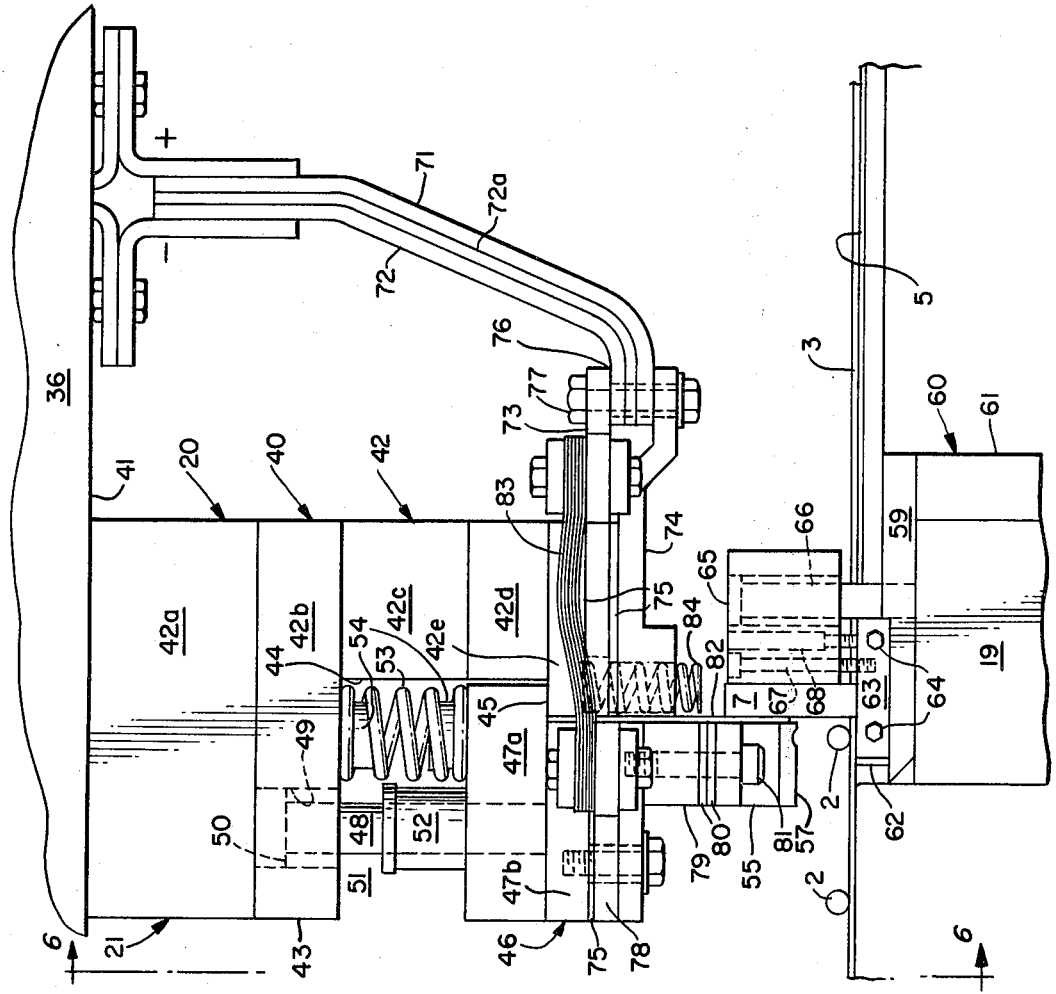
FIG. 4 is a fragmentary side elevational view on an enlarged scale showing the ram and welding head in retracted position.
Figure 6:
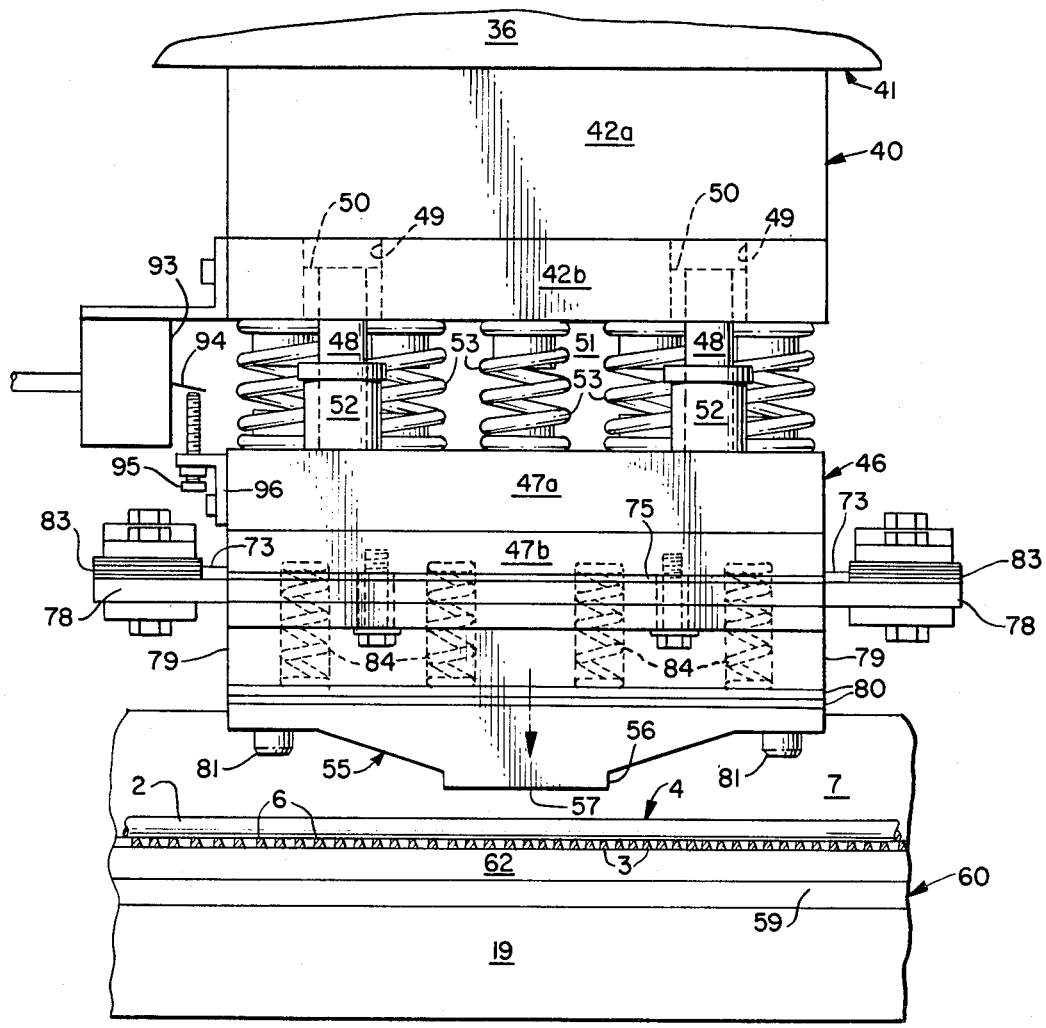
FIG. 6 is a fragmentary front elevational view taken along lines 6—6 of FIG. 4.

Referring now in detail to the drawings in which like reference characters designate like parts, the improved resistance welding machine of the present invention, while adaptable for fabricating welded structures or weldments in which one set of members is welded in succession to another member at a welding station, is particularly designed for fabricating structures, such as filter or separator screens, mats, gratings and meshes, in which the one set of members and the other member are crossed sets of spaced wires, rods or bars welded together at their crossing points. As exemplary of the invention, the preferred resistance welding machine has been illustrated in a form particularly suited for fabricating filter or separator screens by progressively welding each of a succession or set of transverse or cross wires, rods or bars, hereinafter termed generally "transverse wires", to a set of longitudinal wires, rods or bars, hereinafter termed generally "longitudinal wires". As illustrated, usually the wires of the two sets cross at right angles and the wires of each set are laterally spaced and parallel.

In the preferred resistance welding machine, designated as 1, each of the transverse wires 2 is progressively welded to the set of longitudinal wires 3 at a welding station 4 extending transversely of or across the longitudinal wires and the longitudinal wires are incrementally fed, advanced, drawn or pulled to and through the welding station in increments predetermined by the lateral spacing of the transverse wires desired in the finished or product screen. Initially loaded, usually manually, as a set of the desired number and length, on a feed table or platform 5 positioned, at least during fabrication of one or more screens from the set, in advance of and aligned longitudinally with the welding station 4, the longitudinal wires 3 are guided along the table and to and through the welding station in notches or grooves 6, of the required number, shape, size and lateral spacing for the particular set, in the bottom or underside of a guide bar 7 mounted for limited relative vertical movement on and extending across the front end of the feed table parallel to the welding station and, for its bottom notches, often called a "V-bar".

Initially inserted through the notches or grooves 6 in the bottom of the guide or V-bar 7, sufficiently to expose their leading end portions for welding to a transverse wire 2 at the welding station 4, the longitudinal wires 3, as fabrication of the screen proceeds, are incrementally fed, advanced or drawn to and through the welding station and, as a fabricated part of the screen, drawn onto a run-out table 8 on the discharge side of the welding station and of a length to accommodate a maximum length screen, on laterally spaced longitudinally extending support ribs 9, by a pulling or tensioning device 10 drivable intermittently and incrementally longitudinally of the table. The pulling device 10 engages at least the leading or first-welded of the transverse or cross wires 2 by hook means, suitably in the form of a single hook or block 11 extending longitudinally, transversely of or across the longitudinal wires and grooved or notched longitudinally in its bottom or underside for receiving or hooking one of the transverse wires. Conveniently, the hook 11 is bracket-mounted, releasably or removably, on and rearwardly of a carrier or pull plate 12 extending transversely of the run-out table 8, for enabling the hook, between screens, to be removed from the leading transverse wire of one and applied to the leading wire of a succeeding screen and then reattached to the carrier plate. In turn, the carrier plate 12 is slidably and preferably anti-frictionally mounted at opposite ends on guide shafts or guideways 13 extending the length of the table, along which it is driven by a pair of end-journalled, drivably connected worm or threaded shaft drives 14 driven or rotated by an electric or other suitable, variable speed drive motor 15.

For progressively welding each transverse wire 2 to the longitudinal wires 3 at the welding station 4, the improved welding machine 1 has a frame 16, the support members of which preferably are a pair of laterally or transversely spaced, vertical or upright side plates 17, upstanding beyond opposite ends of and laterally embracing and extending horizontally substantially normal or at right angles to the welding station 4. Bracing and connecting the lower parts of the side plates 17 toward the front and below the level of the welding station 4, is a cross-beam or girder 18. Mounted on top of the cross-beam 18 is a suitably solid backing or reactance block 19 extending longitudinally and horizontally between the side plates 17 and underlying and at least coextensive in length with and extending laterally forwardly and rearwardly beyond the welding station 4. For access to the backing block 19 and to accommodate the feed table 5, the lower part of the frame 16, rearwardly of the backing block and between the side plates 17, is open-backed.

For mounting the welding unit 21 of its welding means 20 for reciprocable movement transversely of the frame 16 and longitudinally of or along the welding station 4, the welding machine 1 has as part of the frame laterally spaced horizontally disposed guide rails, beams or ways 22 extending longitudinally between and connected as by bolting, to confronting or adjoining sides of the upper parts of the side plates 17. Suitably of vertically elongated box-shape for the preferred manner of mounting the welding unit 21 thereon, the guide rails 22 are spaced above and laterally overlap the welding station 4 and therebetween mount a preferably partly enclosed carriage 23 of the welding unit. Anti-frictionally mounted on tops and bottoms of both guide rails 22, the carriage 23 preferably is so mounted for steadying it against movement, other than longitudinal, on and along the guide rails by "ROUNDWAY" bearings 24 made by Thomson Industries, Inc. of Manhasset, N.Y., and each having a roller assembly 25 riding on a round way in the form of a cylindrical rod 26, fixed as by welding to and centered laterally on the confronting or adjoining top or bottom or upper or lower side of one of the guide rails. For mounting mounting blocks 27 of the bearings 24, the carriage has fixed to each of its front and rear walls 28 and 29, respectively, a pair of gusset-backed, vertically spaced, horizontally disposed, parallel upper and lower mounting plates 30, projecting or outstanding laterally from and longitudinally extending substantially the length of the wall. Vertically embracing or straddling the adjoining guide rails 22, the upper and lower mounting plates 30 on each of the walls 28 and 29 mount adjacent opposite ends, respectively, the upper and lower bearings 24 of a laterally spaced pair of vertically aligned bearings. To take side thrust, the bearings on one of the carriage walls and preferably the front wall 28, are each dual thrust bearings, while those on the other wall are single bearings. So mounted, the carriage 23 of the welding unit 21, can move, ride or roll with minimum resistance along the guide rails 22, while immune to or protected against movement in any other direction.

With the carriage 23 its steady platform, the welding unit 21 is drivable intermittently and incrementally along the guide beams 22, preferably by a worm drive 31 including a threaded shaft or a worm 32 extending between and parallel to the guide rails 22 forwardly of the front wall 28 of the carriage and journalled at opposite end portions in or on the side plates 17. Driven or rotated from one end by a preferably hydraulic motor 32 conveniently mounted on the outside of the adjoining side plate 17, the shaft 32, for driving the carriage 23 along the guide rails 22, extends through and turns or rotates in an internally threaded block or nut 34 fixed to and projecting forwardly from the carriage's front wall 28.

With an interior compartment 35 closed except at the bottom and accessible from a side through an access panel (not shown), the carriage 23 houses or contains in the compartment the transformer 36 of the welding unit 21. Suitably of the sealed-casing type, the transformer 36 is mounted for reciprocal relative vertical movement in the carriage's compartment 35, conveniently by guide bushings 37 mounted on its front 38 and slidable on a pair of laterally spaced, vertical and parallel slide rods 39 bracket-mounted on the inside of the carriage's front wall 28. The transformer 36 itself mounts toward the front a ram 40 fixed, as by bolting, to and suspended or depending from its base or bottom 41. Attached or fixed against relative movement to or for movement in unison with the transformer 36 and preferably generally rectangular in cross-section, the illustrated ram 40, for convenience in construction and ready adjustment of its height to suit various working conditions, is multi-layered or laminated vertically by being formed of a stack or column of superimposed blocks 42, with each block fixed as by bolting or screwing, to the next higher block and together in effect forming a unitary structure.

Elongated longitudinally of the welding station 4 and transversely of the welding machine 1, the ram 40 has its front wall 43, below its second block 42b, inset, set back or rearwardly offset at maximum over its third and fourth blocks 42c and 42d and to a lesser extent over the bottom block 42e, to provide a front and side-opening recess 44 in its front interrupted downwardly at the back by an upwardly facing abutment or shoulder 45 formed by the relative forward projection of the bottom block, for receiving or accommodating a welding head 46 overlying and normally spaced upwardly from the welding station 4. Preferably similarly vertically laminated by being constructed of a stack or column of superimposed blocks 47, bolted, screwed or otherwise releasably connected to each other, the welding head 46 fits in the recess 44 with its upper block 47a spaced below the ram's second block 42b and forwardly of the ram's third and fourth blocks 42c and 42d, respectively at the top and back of the recess 44, and rearwardly overlaps and normally engages or rests on and is supported at the rear by the shoulder 45 on the bottom block 42e.

Mounted on or carried by the ram 40 for limited vertical movement relative thereto, the welding head 46 is guided in such movement by a pair of laterally spaced, vertical, suitably cylindrical, guide posts 48, projecting upwardly into correspondingly cylindrical, concentric or coaxial apertures or openings 49 of larger diameter extending through the ram block 42b and slidably received in bushings 50 press-fitted in the apertures. Normally spaced at their upper ends from the top block 42a of the ram 40 sufficiently to accommodate the maximum upward movement of the welding head 46 relative to the ram, the guide posts 48, in the slot or space 51 between the blocks 42b and 47a, slidably mount floating spacers or collars 52, for limiting downward movement of the ram 40 relative to the welding head 46. In the same slot 51, rearwardly of the guide posts 48, are fitted or mounted a front set of a plurality, preferably five, of vertically disposed, laterally spaced and aligned compression springs 53 seating at opposite ends around positioning bosses 54 on the confronting sides or faces of the blocks 42b and 47a.

Removably mounted, as by bolting, on the bottom of the welding head 46 and depending therefrom, is a front upper welding electrode 55, at the top contacting and preferably of the same area as the bottom of the welding head 46 and at the bottom tapering inwardly and downwardly toward an integral, depending or downstanding contact 56 having a suitably horizontally disposed bottom contact face or surface 57 of an area to laterally overlap the welding station 4 and longitudinally span, embrace or include a group or plurality of the longitudinal wires 3. Directly overlying and normally spaced above and movable downwardly into engagement with a transverse wire 2 in the welding station 4, the contact's bottom face or surface 57, for increasing its lateral contact with the transverse or cross wires or rods of the particular screen being fabricated, may be longitudinally grooved intermediate its sides for receiving and fitting or partly wrapping the presented upper part of the transverse wire.

The top plate or panel 58 of the feed table 5, on the suitably flat, horizontal upper surface or top of which the longitudinal wires 3 are initially assembled and along which they slide in being incrementally fed through the guide bar 7 to and through the welding station 4, while forwardly partly overlapping the top of the backing or reactance block 19 on the frame 16, does not itself directly contact or engage that block, instead being spaced above the block by the top horizontal flange 59 of a built-up angle iron or bracket 60, a vertical depending flange 61 of which, spaced rearwardly of the front end of the top plate 58, engages the back of the block. The angle iron 60 as a whole overlaps and its top flange 59, projects forwardly beyond the front end and laterally outwardly beyond the sides of the table's top plate 58. Extending substantially to the front of the backing block 19, the top flange 59, forwardly of the front end of the top plate 58, is downwardly offset or recessed to seat or receive an electrically conductive platen or anvil 62, suitably formed as a flat block or plate of a metal of high conductivity, such as copper. Underlying and extending forwardly beyond the welding station 4 and rearwardly beyond the guide bar 7, the platen 62 is held in its seat with its upper surface coplanar with that of the feed table's top plate 58, conveniently by a pair of end blocks 63 bolted to or rigid with and upstanding from the top flange 59 outwardly beyond opposite ends of the platen and each carrying or mounting a pair or plurality of laterally spaced set screws 64 engaging or acting against the adjoining or confronting end of the platen.

Also made of electrically conductive material or metal, such as copper, the preferred bottom-notched or grooved guide or V-bar 7 is rectangular and vertically elongated in cross-section and is releasably mounted, as by bolting, at the rear and adjacent opposite ends on a mounting block 65 extending across and outwardly beyond opposite sides of the feed table's top plate 58 and each overlying one of the laterally projecting side portions of the top flange 59. In turn, the mounting block 65 is vertically apertured rearwardly of the platen 62 and outwardly of the top plate 58, for slidably receiving a pair of vertical guide posts 66 press-fitted at their lower ends into the top flange 59 for guiding vertical and preventing other relative movement of the mounting block and guide bar 7. The relative vertical movement of the mounting block 65 is limited upwardly by vertical cap screws 67 slidably received in opposite end portions of the block and therebelow screwed into the platen 62 rearwardly of the guide bar 7, and downwardly by vertical set screws 68 screwed or threaded from above into the block's end portions and projecting therebelow for end engagement with the top of the platen. While guiding and limiting vertical movement of the mounting block 65 and therethrough the guide bar 7, the guide posts 66, cap screws 67 and set screws 68 are all preferably downwardly inset into the block so as not to project thereabove in the operation of the welding machine 1. The cap and set screws 67 and 68 are adjustable or actuatable from the top through their openings or apertures in the mounting block 65 and the set screws serve a dual function in not only limiting downward movement of the guide bar 7 during operation of the machine to suit the particular screen or other work being fabricated but also, during the initial loading of the feed table 5, serving as jacks for enabling the guide bar to be raised to facilitate insertion of the leading ends of the longitudinal wires 3 into its bottom notches or grooves 6 and thereafter lowered to its normal longitudinal wire-guiding position.

For the welding current used in progressively welding each of a succession of transverse wires 3 to the longitudinal wires 2, the welding machine 1 differs from conventional resistance welding machines and resembles a resistance welding machine, called an "ULTRAPULSE", marketed by Union Carbide, in applying as welding current in each step of a progressive welding operation on a transverse wire in the welding station 4, a single, brief or short duration pulse of direct current. As in the "ULTRAPULSE" machine, alternating current of suitable power obtained from a power source, is led to an electrical supply unit of the power supply units indicated at 69, suitably housed or contained in a separate movable cabinet (not shown) adjacent the machine 1, for converting the upper halves of the sine waves of the alternating source current into direct current and applying the latter to charge a capacitor bank (not shown), which, when charged, is adapted to discharge a pulse of direct current. As discharged, the pulses are transmitted to the primary of the transformer 36 by flexible cables, which, to prevent kinking in following the transverse movements of the welding unit 21 along the welding station 4, within the lateral confines of the frame 16, are held or supported in and guided by a suitably jointed-link type, flexible carrier or guide member 70 mounted rearwardly of the rear guide rail 22 and extending between and connected at opposite ends to the side plate 17 adjoining the electrical supply unit 69 and to the upper part of the carriage 23.

Correspondingly pulsed and preferably variable in power to suit the particular screen or other workpiece being fabricated, by selectively tapping the secondary of the transformer 36, the selected output direct current is taken off the transformer by positive and negative secondary leads 71 and 72, respectively, relatively insulated or insulated from each other, as by a flexible sheet 72a of insulating or dielectric material of suitable dielectric constant sandwiched or interposed between them. At their lower ends, the secondary leads 71 and 72 are bolted between rearward extensions of upper and lower, suitably rigid, conductors, bus bars or plates 73 and 74, respectively, mounted on the ram 40 below the bottom block 42e and insulated from that block and each other by intervening layers 75 of insulating material. Preferably inturned toward their lower ends to fit between the rearward extensions of the bus bars 73 and 74, at their common bolted junction 76 therewith, the secondary leads 71 and 72 are each clamped in electrical contact to one of the bus bars, the upper, preferably negative lead 72 to the upper bar and the lower, preferably positive lead 71 to the lower bus bar, with shorting of the leads by the plurality of connecting bolts 77, prevented by insulating the bolts below the upper bus bar from both the leads and the lower bus bar. A third or front, suitably rigid, conductor, bus bar or plate 78 is insulatedly mounted on or connected to the bottom or underside of the lower block 47b of the welding head 46. In turn, the front bus bar mounts, carries or suspends or has depending from it toward the back of the welding head, the preferably relatively narrow, electrically conductive front upper welding electrode 55 and a correspondingly narrow laminated or laminarly constructed, electrically conductive, intervening or interposed spacer column 79 through which the front electrode and the welding head bus bar are connected. The spacer column 79 includes any electrically conductive shims or spacers 80 needed for adjusting its height and the consequent vertical spacing of the front electrode 55 below the welding head 46. The front electrode 55 and spacer column 79 conveniently are removably or detachably connected to the front bus bar 78 on or in the welding head 46 by a pair of vertical, headed connecting bolts 81 extending upwardly through end portions of the electrode and through the column and screwed or threaded from below into the bus bar, which in turn is insulatedly screwed or bolted to the lower or second block 47b of the welding head.

Connected to the welding head 46 for vertical movement in unison therewith, the front bus bar 78, spacer column 79, and front welding electrode 55 in effect form a lower part or extension of the welding head and as such are movable therewith to a limited extent vertically relative to the ram 40, as well as the guide bar 7 and are insulated at the back from the guide bar and upper and lower bus bars 73 and 74 forming the lower part of the ram, by an intervening sheet 82 of insulating material conveniently attached to the back of the welding head and extending downwardly over the front electrode and preferably upwardly to the welding head's upper block 47a.

Movable vertically relative to the upper and lower bus bars 73 and 74 on the ram 40, and otherwise insulated from the upper bus bar, the front or welding head bus bar 78 and the upper ram bus bar both project laterally beyond opposite sides of the welding head and ram and, to compensate for their relative vertical movement, are electrically connected laterally outwardly from and preferably at both sides of the ram and welding head by a pair of flexible electrodes 83, each connected at ends, as by bolting, to the adjoining or corresponding lateral projections of the bus bars.

In addition to the upper and lower bus bars 73 and 74, the ram 40 mounts or carries toward the front in its lower part a laterally extending set or plurality of laterally spaced, vertically acting, compression coil springs 84, substantially smaller and less in their individual and total capacity, strength or resistance to compression than the set of springs 53 acting between the ram and the welding head 46. Conveniently press-fitted at the top into the bottom block 42e of the ram 40, the springs 84 extend downwardly through the insulating layers 75 and through and are guided by the lower bus bar 74 with only sufficient clearance to inhibit binding, but extend past the upper bus bar 73 with adequate lateral clearance to prevent shorting. In the normal or retracted position of the ram 40, the springs 84 project or extend downwardly below the lower bus bar 74 in substantial vertical alignment with but normally spaced above the top of the guide bar 7, which preferably extends slightly above its mounting block 65.

The previously described reciprocal vertical movement of the transformer 36, ram 40 and welding head 46 of the welding unit 21 relative to its carriage 23, are applied or imparted to the transformer by a vertically acting, double-acting hydraulic cylinder or cylinder or piston unit 85 mounted on and preferably centered laterally on and offset forwardly of the top or top wall 86 of the carriage, in substantial vertical alignment with the ram 40. With its piston rod 87 extending downwardly into the compartment 35 in the carriage 23 and there secured or fixed to the top of the transformer 36 and its opposite or upper and lower ends alternatable between input and discharge of hydraulic fluid by connection to the hydraulic power supply unit of the supply units 69, through flexible tubing conveniently supported against kinking within the frame 16 by the flexible carrier 70, the hydraulic cylinder unit 85, as desired, can vertically advance or retract the transformer and therethrough the ram 40 and welding head 48, toward and away from the welding station 4. For counterbalancing the weight of the transformer 36 and the other components of the welding unit 21 suspended therefrom, there also are preferably mounted on the top wall 86 of the carriage 23 a pair of upwardly acting pneumatic cylinder units 88 having their piston rods 89 secured to the top of the transformer and exerting an upward force assisting the retract stroke and somewhat cushioning the advance stroke of the hydraulic cylinder 85. The pneumatic cylinders 88 are supplied with compressed air from and balanced in their upward forces by a common receiver tank 90 conveniently mounted on the carriage's top wall 86 forwardly of the double-acting cylinder or power unit 85. While limited to a short stroke of about $\frac{3}{4}$ to 1 inch in a welding operation, the hydraulic power unit 85 preferably is capable of a longer stroke on the order of about 6 inches and this longer stroke is available to provide additional clearance for facilitating changes in or repair of the welding unit 21.

Figure 7:
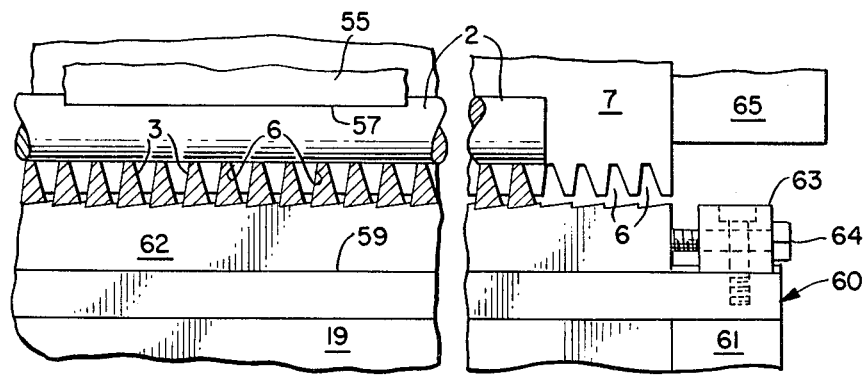
FIG. 7 is a fragmentary vertical sectional view taken along lines 7—7 of FIG. 5.

If, as in the exemplary embodiment, the structure being fabricated is a screen of the type used in separating suspended solids from flowing slurries or smaller from larger solid particles, the screen is welded upside down or inverted and the longitudinal screen wires 3 ordinarily are wedge or V-shaped, tapering upwardly during fabrication and downwardly in the finished screen, and presenting flat or rounded narrow edges or apices for successive welding to the transverse wires 2. In turn, the transverse wires 2 may be round, rectangular or of other suitable shape and, since serving primarily as tie rods for connecting the longitudinal wires and reinforcing the finished screen rather than as part of the screen's screening or separating deck formed by the flat tops or bases of the longitudinal wires, the lateral spacing of the transverse wires ordinarily will be much greater than that of the longitudinal wires. If, as in the usual screen, the longitudinal wires 3 are perpendicular or normal to the transverse wires, the notches or grooves 6 in the guide bar 7 will be vertically disposed and the top of the platen 62 suitably will be an uninterrupted flat surface. However, if, as in my Pat. No. 4,221,951, the longitudinal wires 3 are transversely tilted relative to the transverse wires 2, then, as illustrated in FIG. 7, the guide bar notches 6 will be correspondingly tilted and the top of the platen 62 correspondingly notched.

While, as previously described, the guide bar 7, its mounting block 65 and the platen 62 are all mounted at the front of the feed table 5 on a forwardly projecting flange 59 mounted on the underside and projecting forwardly from the front end of the top or top plate 58 of the feed table, if the welding machine 1 had only one feed table, the table could be a stationary part of the frame 60 or the forwardly projecting flange could be replaced by an upward extension of the fixed backing or resistance block 19. The problem this presents, if, as at present, the feed table 5 is manually or hand-loaded with a set of the longitudinal wires 3 required for fabricating a certain number of screens and the welding machine 1 otherwise is adapted by associated controls for either fast automatic or manually controlled operation, the loading of a feed table is a tedious and time-consuming operation which, if required to be performed each time the feed table is emptied of its longitudinal wires, would markedly reduce the machine's overall production rate. To eliminate this problem, the feed table 5 preferably is but one of a plurality of conveniently wheel or roller-mounted, like or counterpart, interchangeable feed tables separable or removable from the welding machine 1 and reloadable or preloadable away from the machine in a convenient loading area, while the machine is being supplied with longitudinal wires from another or other feed tables. When returned, loaded, to the welding machine, the angle iron 60 at the front of the table serves as a combined slide and backstop for positioning the table and components mounted thereon for the next series or sequence of welding operations or stages on the transverse wires.

Another timesaver in the operation of the machine, is its use on the welding head 48, instead of a conventional electrode capable at one time of welding a transverse wire to a longitudinal wire at only a single crossing point, of the front welding electrode 55, the bottom or contact face 57 of which is of a length longitudinally of the welding station 4 to span or embrace a group, plurality or multiplicity of the longitudinal wires and simultaneously weld thereto the presented or contacted part of the transverse wire 2 in the welding station. For versatility in the screens or other crossed-wire weldments it is capable of fabricating, the welding machine 1 preferably has a number or plurality of interchangeable front electrodes 55, which and their contact faces 57, while uniform in width laterally of the welding station 4, vary in the lengths of their contact faces, suitably over a range of from about 1 inch to about 2½ inches (2.54–6.35 cm.), for spanning, embracing a correspondingly wide group of plurality or multiplicity of longitudinal wires and simultaneously welding a transverse wire thereto.

The power supply units 69 through or by which the welding machine 1 is supplied with its requirements of electric, hydraulic and pneumatic power, include, in addition to the previously mentioned auxiliary cabinet-housed electrical supply unit, suitably separate hydraulic and compressed air units or packages separately mounted in areas convenient for their connection to the welding machine. For either automatic or manual control of its operation, the illustrated welding machine 1 is equipped with presettable or programmable machine and logic controls, suitably having solid state, printed board control circuits, and conveniently divided between two control panels or units, one of the units, 91, mounted on the outside of the side plate 17 opposite that mounting the drive motor 33 driving the carriage 23, for controlling the drive of the carriage, and the other, 92, mounted on the same or corresponding side of the run-out table 8, containing main controls for automatically coordinating the operations of the machine's several operating components and separate controls for individually controlling the hydraulically-actuated components and the pulling or feeding device 10 for the longitudinal wires 3 on the run-out table 8.

Fitting over or receiving the adjoining projecting end of the drive shaft 32 and conveniently measuring the transverse movements of the carriage 23 by rotations of the drive shaft, the frame-mounted control unit 91, in controlling the transverse movements of the welding unit 21, is adapted not only to reverse the direction of movement of the welding unit between welding stages on successive transverse wires 2 so as to weld alternate transverse wires in opposite directions, but also, regardless of the direction of the drive, to predetermine the length of the increments in which the carriage is driven and the dwells therebetween to suit the length of the contact face 57 of the welding head electrode 55 and the timing of the progressive weldings of successive transverse wires, in a welding operation or sequence for fabricating one or more like screens or other welded structures from sets of longitudinal and transverse wires.

In a welding operation or sequence of the welding machine 1 of the present invention in which one or more screens or other crossed-wire structures or weldments, and fabricated from sets of transverse and longitudinal wires 2 and 3 of the desired number, dimensions and shape, by welding transverse wires in succession and spaced relation to spaced longitudinal wires at a welding station, the operation is begun with the longitudinal wires 3 loaded on a feed table 5 fixed or, if separate, clamped or otherwise releasably attached in feeding position to the main frame 16 and the longitudinal wires threaded or projected into the welding station 4 through the laterally spaced notches or grooves 6 in the bottom of the guide bar 7 mounted on the table. The welding machine fabricating at least screens in inverted or upside down position, before welding is begun, a transverse wire 2, the first for the particular screen or screens to be fabricated from the set of longitudinal wires on the feed table 5, and of a length to extend transversely across the longitudinal wires 3, is led or fed to the welding station and then laid on top of and across the leading end portions of the longitudinal wires projecting forwardly from the guide bar 7. In turn, the welding unit 21, with its ram 40 and welding head 46 retracted, is positioned on the guide rails 22 with the rear set of springs 84 projecting downwardly from the ram and spaced above and vertically aligned with the guide bar 7 and the front welding electrode 55 on the welding head spaced above and vertically aligned with the transverse wire 2 in the welding station and its contact face 57 overlying and spanning part of the transverse wire and the underlying group, plurality or multiplicity of the longitudinal wires 3 in or at one side of the longitudinal wires and corresponding in width to the length of the contact face.

With the above pre-positioning of the transverse and longitudinal wires 2 and 3 and the welding unit 21, the actual welding operation or sequence is begun or commenced by applying hydraulic pressure to the upper end of the hydraulic power unit 85 to power its advance or downward stroke. Since the piston rod 87 of the power unit, the transformer 36 and the ram 40 are directly or rigidly connected against relative movement, the ram under the downward force of the power unit 85 transmitted to it through the transformer 36, begins its advance or downward stroke, which, continuing, engages first the rear set of springs 84 and then the lower bus bar 74 with the top of the guide bar, in process compressing the springs into the bottom of the ram and at the end of its downward or advance stroke, applying a downward force on the guide bar sufficient to clamp or hold the longitudinal wires 3 against longitudinal movement between the guide bar and the platen 62 with the guide bar spaced only slightly above the platen.

In the course of its downward or advance stroke, the ram 40 also acts through the interposed, relatively strong or more compression-resistant front set of springs 53, on the welding head 46 and drives the welding head downwardly to contact the front electrode 55 on its bottom with the transverse wire 2 in the welding station 4. With the initial or normal spacing between the front electrode 55 and the transverse wire 2 preferably greater than that between the guide bar 7 and lower bus bar 74 on the ram 40 but less than that between the guide bar and rear set of springs 84, the front electrode will contact the transverse wire after the rear set of springs but before the lower bus bar has contacted the guide bar, thus causing the ram to move downwardly relative to the welding head, after the initial contact of the front electrode with the transverse wire, and compress the front springs and at the limit of its downward movement or advance stroke, apply a welding force to the transverse wire and underlying group of longitudinal wires greater than the clamping force applied to the longitudinal wires in advance of the welding station by the guide bar. Accordingly, if, as in the exemplary welding machine, the total downward force exertible by the hydraulic power unit 85 is from about 12,000 to about 15,000 pounds (5448–6810 kg.), of which around 8,000 pounds (3632 kg.) is applied to compress the front springs 53 and only about 1,500 pounds (681 kg.) is applied to compress the rear springs 84, the welding force on the transverse wire will range from about 10,500 to 13,500 pounds (4767–6129 kg.), while the range of the clamping force on the guide bar will be only from about 4,000 to 7,000 pounds (1816–3178 kg.) and, if needed, the welding force can readily be increased by precompressing the front set of springs.

As soon as the main control unit 92 senses, by termination of the downward stroke of the ram 40 and flow of hydraulic fluid to the upper end of the power unit 85, that the welding electrode 55 and the guide bar 7 are in their welding positions, the controls, if the machine is in its usual automatic mode, fires or discharges the capacitor bank of the electric power supply unit and, from a suitable a.c. input of 60/120 amps, and 480/240 volts, produces at the secondary of the transformer an output pulse of direct current variable, by selectively tapping or connecting the secondary leads 71 and 72 to the transformer's secondary to suit the sizes of the wires being welded, in width or duration from 1–15 milliseconds and in amperes from 10,000 to 200,000. The output pulse is transmitted through the transformer's positive secondary lead 71 to the lower bus bar 74 on the ram 40.

With its mounting block 65 suitably relatively low conductivity steel, the copper or like high conductivity guide bar 7 requires no insulation therefrom and, acting as a rear upper electrode, transmits the pulse of welding current received from the lower bus bar 74 to the copper or like electrically conductive platen 62, with little resistance from the slight air gap therebetween. Flowing forwardly through the platen 62 to the welding station 4, the welding current pulse, in flowing upwardly through the high resistance of the group of longitudinal wires 3 and part of the transverse wire spanned by the contact face 57 of the front welding electrode 55, generates or develops at their interfaces or crossing points, the heat required at the applied pressure to weld the wires together, before passing as a pulse of reduced voltage through the front electrode and conductive column 79 to the bus bar 78 in the welding head 46 and thence through the flexible conductors 83, upper ram bus bar 73 and negative secondary lead 72 back to the secondary of the transformer 36.

During the actual welding, the potential forces of the front and rear sets of springs 53 and 84 are available, as needed, as downward spring or resilient forces for preventing displacement of the wires being welded by forces developed by the welding current incident to the welding, and the front electrode 53, the platen 62 and to a relatively limited extent the guide bar 7, since having high heat transfer coefficients, are available as heat sinks for rapidly dissipating the heat generated in the welding. With the width of the pulse at maximum only about 15 milliseconds, the actual weld time is very short, and the capacitor bank begins to recharge immediately after firing with a maximum recharge time of about two seconds.

In case of an unlikely failure of the automatic controls to fire the capacitor bank when the welding electrode 55 on the welding head 46 and the lower bus bar 74 on the ram 40 reach welding position, the welding machine may include a microswitch 93 as a back-up firing device. Since the slot 51 between the block 42b of the ram 40 and the upper block 47a of the welding head 46 reaches minimum height when the ram 40 and welding head 46 reach welding position, the microswitch 93, normally open and connected in the firing circuit of the capacitor bank, conveniently is mounted on the ram above the slot. Mounted on and projecting forwardly and downwardly of the block 42b of the ram 40, the microswitch 93 has an inwardly projecting switch arm 94 engageable with and normally spaced from a vertically adjustable actuating bolt 95 mounted by a bracket 96 on the front of the upper block 47a of the welding head 46. Adjustable to compensate for any variations in the minimum height of the slot 51, the actuating bolt 95, when so adjusted, will close the microswitch 93 when the slot reaches minimum height and, if necessary, override the normal controls and cause the capacitor bank to fire at the proper time.

While the capacitor bank is being recharged, the ram 40 remains in its down or welding position momentarily after the welding to ensure the integrity of the welds and then is retracted by reversal of the hydraulic power unit 85 and in process retracts the welding head 46 by engagement of the shoulder 45 on the ram's bottom block 42e with the overlapping upper block 47a of the welding head. The advance and retract strokes or vertical movements of the ram 40, in the welding cycles or steps of a welding operation, are short, usually in the range of ¾ to 1 inch (1.91–2.54 cm.). As soon as the ram 40 has been retracted, clearing the welding electrode 55 of the transverse wire 2 in the welding station 4 and the rear springs 84 of the guide bar 7 and thus relieving the guide bar of any downward force aside from its own weight and that of its mounting block 65, the carriage drive motor 33 is activated for shifting the welding unit 21 to a position for welding the next part of the transverse wire in the welding station to the next group of longitudinal wires 3 in the next step or cycle of the stage of the welding operation in which the transverse wire is progressively welded to the longitudinal wires. At maximum the cycle rate is about two seconds per cycle or between firings of the capacitor bank, and the initial cycle or step is repeated as often as necessary to weld the transverse wire in the welding station to all of the longitudinal wires at their crossing points.

At the end of the above first stage in the operation of the welding machine 1 for welding a screen or other crossed-wire structure from transverse and longitudinal wires, the stages, each involving a welding of a transverse wire to all of the longitudinal wires, are repeated until a screen or like structure of the desired length has been fabricated or, more usually, will be continued to the end of the longitudinal wires on the feed table 5 and the welded structure, if too large, then cut transversely and/or longitudinally into two or more screens of the desired sizes.

After the first stage of a welding operation on a given set of longitudinal wires, the pulling or feeding device 10 is hooked to the first-welded or leading transverse wire 2. In the illustrated embodiment this is accomplished by retracting the carrier plate 12 to a position adjacent the welding station 4, detaching the preferred single hook 11 from the carrier plate, hooking the hook over the then-welded first transverse wire and reattaching the hook to the carrier plate. The feeding plate 10 is then advanced or driven forwardly to feed, drive or pull the longitudinal wires 3 through the welding station 4 by the increment determined by the desired spacing between the transverse wires in the finished structure. Thereafter, to the extent of the length of the run-out table 8, the attachment of the hook 11 to the leading transverse wire, suffices for enabling the feeding device 10 to incrementally and intermittently feed the longitudinal wires 3 on the feed table 5 then in feeding position, to and through the welding station 4 after each welding stage. Since reversible in transverse drive, the carriage 23 of the welding unit 21 conveniently is reversed for welding the next transverse wire in the opposite direction and thus in a welding operation welding alternate transverse wires in opposite directions or from opposite ends, with consequent elimination of lost motion in the transverse movements of the carriage.

From the above detailed description it will be apparent that there has been provided an improved resistance welding machine for welding screens or other crossed-wire structures at a welding station, which in each stage of a welding operation progressively welds a transverse wire to successive groups of longitudinal wires, is adapted to weld transverse wires in alternate stages in opposite directions and has for welding a traverseable welding unit having a carriage mounted for transverse movement longitudinally of the welding station and a transformer mounted for reciprocal vertical movement in the carriage, the transformer not only mounting and, from a power unit on the carriage, transmitting power to a ram and welding head for powering their advance and retract strokes but also, by having short, fixed-length secondary leads connected to conductors in the ram, minimizing both the resistance of the leads to flow of welding current to the welding station and the resulting reduction in the electrical power available for welding at the station. It should be understood that the described and disclosed embodiment is merely exemplary of the invention and that all modifications are intended to be included that do not depart from the spirit of the invention and the scope of the appended claims.

I claim:

1. A resistance welding machine for welding one set of members in succession and spaced relation to another member at a welding station extending transversely of the other member, comprising welding means including a welding unit having a carriage intermittently and incrementally drivable above and along the welding station, a transformer mounted for relative reciprocal vertical movement in said carriage, ram means suspended from said transformer for movement in unison therewith, welding electrode meand depending from said ram means and normally spaced above a member of the one set in the welding station and engageable therewith in an advance stroke of said ram means for applying welding pressure during welding of said member of the one set to the other member, and power means mounted on said carriage and acting through said transformer for powering advance and retract strokes of said ram.

2. A resistance welding machine according to claim 1, wherein the one set of members is a set of laterally spaced transverse wires and the other member is a set of laterally spaced longitudinal wires, each transverse wire is progressively welded in cycles to the longitudinal wires in a stage of a welding operation of the machine, the welding means includes guide means for guiding the longitudinal wires to and through the welding station and platen means underlying said guide means and the welding station and thereunder supporting the longitudinal wires, and the guide and platen means are separate from and mounted independently of the welding unit.

3. A resistance welding machine according to claim 2, wherein the guide means and the platen means are electrically conductive and in a welding cycle cooperate with the welding electrode means depending from the ram means for passing welding current through a part of the transverse wire in the welding station presented to and engaged by the welding electrode means and any longitudinal wires engaged by said part for welding said part thereto.

4. A resistance welding machine according to claim 3, including means for incrementally feeding the longitudinal wires to and through the welding station between stages of a welding operation.

5. A resistance welding machine according to claim 4, including a run-out table projecting forwardly from a side of the welding station, and the feeding means includes carrier means intermittently and incrementally drivable along said run-out table and carrying hook means for engaging at least the firstwelded of the transverse wires of a crossed-wire structure being fabricated in the machine.

6. A resistance welding machine according to claim 3, including a welding head mounted for limited relative vertical movement of the ram means and mounting the welding electrode means, and the ram means in a downward stroke powered by the power means through the transformer acts independently on the guide means and said welding head for respectively clamping the longitudinal wires against movement to the platen means in advance of the welding station and applying welding pressure to the part of the transverse wire presented to the welding electrode means.

7. A resistance welding machine according to claim 6, including front vertically acting spring means interposed between the ram means and the welding head, and rear vertically acting spring means mounted in the ram means and in the normal or retracted position thereof projecting below a bottom of the ram means and spaced above and vertically aligned with the guide means, the ram means in an advance stroke compressing the front spring means and therethrough acting on the welding head and welding electrode for applying welding pressure to the presented part of the transverse wire in the welding station and in acting on the guide means first compressing said rear spring means against and then engaging by said bottom thereof a top of the guide means.

8. A resistance welding machine according to claim 7, including insulated rear conductor means in the ram means and front conductor means in the welding head, and secondary leads of the transformer connected to said rear conductor means, and wherein in a welding cycle welding current for welding a transverse wire to longitudinal wires in the welding station flows between said secondary leads through said front and rear conductor means.

9. A resistance welding machine according to claim 8, wherein the welding current is a pulse of direct current produced by firing of a capacitor bank connected to a primary of the transformer.

10. A resistance welding machine according to claim 8, wherein the rear conductor means are a lower bus bar at the bottom and an upper bus bar thereabove in the bottom part of the ram means and each electrically connected to one of the secondary leads of the transformer, and the front conductor means is a bus bar electrically connected to the welding electrode, and including flexible conductor means spaced laterally outwardly from the ram means and welding head and electrically connecting the front bus bar to one of the rear bus bars, and insulator means mounted on the back of the welding head and insulating the front bus bar from the other rear bus bar and the welding electrode from the guide means.

11. A resistance welding machine according to claim 3, including a feed table whereon a set of longitudinal wires is loaded for feeding in a feeding position thereof to and through the welding station, and wherein the guide means and platen means are mounted on said table respectively for limited relative vertical movement and stationarily.

12. A resistance welding machine according to claim 11, wherein the feed table is one of a plurality of like interchangeable feed tables releasably connected in feeding position to a frame of the welding machine and removable therefrom after unloading set of the longitudinal wires for reloading while the welding machine is fed longitudinal wires by at least one of the other tables.

13. A resistance welding machine according to claim 2, wherein the guide means and platen means are electrically conductive and in welding position extend longitudinally substantially the length of and parallel to the welding station, and the guide means is a guide bar vertically elongated in cross-section and having in a bottom thereof laterally spaced grooves of a desired shape and lateral spacing for receiving and guiding the longitudinal wires to and through the welding station.

14. A resistance welding machine according to claim 1 wherein the one set of members is a set of laterally spaced transverse wires and the other member is a set of laterally spaced longitudinal wires, each transverse wire is progressively welded in cycles to the longitudinal wires in a stage of a welding operation of the machine, the welding electrode means for progressively welding each transverse wire to the longitudinal wires is a single electrode presenting for engagement with a transverse wire in the welding station a contact face of a length longitudinally of the welding station to span and simultaneously weld a plurality of longitudinal wires to the transverse wire in each welding cycle.

15. A resistance welding machine according to claim 1, wherein the carriage of the welding unit is alternately drivable in opposite directions along the welding station for enabling the welding unit to weld members of the one set to the other member from either side of the other member.

16. A resistance welding machine according to claim 1, wherein the power means is a double-acting hydraulic cylinder unit mounted on the carriage above and connected by a depending piston rod to the top of the transformer, and the piston rod is of a length to accommodate both short strokes of the ram means during a welding operation and a manually controlled relatively long retract stroke when needed to facilitate access to the welding unit.

17. A resistance welding machine according to claim 16, including upwardly acting pneumatic cylinder unit means mounted on the carriage and connected to the transformer for counterbalancing the weight of the transformer and components of the welding unit suspended therefrom.

* * * * *